July 2, 1968   F. H. VAN WINSEN ET AL   3,390,892
INSTALLATION FOR THE AUTOMATIC ADJUSTMENT OF THE FLOOR
HEIGHT OF A VEHICLE
Filed Jan. 12, 1966

INVENTORS.
FRIEDRICH H. VAN WINSEN
KURT ENKE

BY Dicker + Craig

ATTORNEYS

United States Patent Office 3,390,892
Patented July 2, 1968

3,390,892
INSTALLATION FOR THE AUTOMATIC ADJUST-
MENT OF THE FLOOR HEIGHT OF A VEHICLE
Friedrich H. Van Winsen, Kirchheim, Teck, and Kurt
Enke, Fellbach, Wurttemberg, Germany, assignors to
Daimler-Benz Aktiengesellschaft, Stuttgart-Unterturk-
heim, Germany
Filed Jan. 12, 1966, Ser. No. 520,114
Claims priority, application Germany, Jan. 12, 1965,
D 46,230
15 Claims. (Cl. 280—6.1)

ABSTRACT OF THE DISCLOSURE

A system for the automatic adjustment of the floor height of a spring-supported vehicle superstructure, comprising wheel suspension means for spring-supporting the wheels at the vehicle superstructure including shock absorbers which are under the effect of a pressure medium, springs and a control system including a pressure medium system having a high pressure tank and a low pressure tank, and a selectively operable device for selectively connecting the shock absorbers with either the high pressure tank or the low pressure tank depending upon the condition of the springs between the wheels and the vehicle superstructure, the control system including means controlled by the spring movements of the wheels which are operable, at a relatively lower floor height of the vehicle superstructure, to connect the pressure space of each shock absorber by way of a check valve with the high pressure tank during inward spring movements of the wheels and to connect each pressure space of the shock absorbers during outward spring movements of the wheels by way of an excess pressure valve with the low pressure tank, thereby effectively pumping pressure medium from the low pressure tank to the high pressure tank, whereas at a relatively greater floor height of the vehicle superstructure, the control system is operable to connect the high pressure tank and the pressure space of each shock absorber directly with the low pressure tank so that the pressure in the shock absorber system can be relieved by back-flow of the pressure medium into the low pressure tank.

---

The present invention relates to an installation for the automatic regulation of the floor height of the spring-supported superstructure of a vehicle in dependence on the load thereof, and aims above all at achieving a rapid and safe adjustment with relatively simple means, especially hydraulic means. The present invention is of significance in particular for independent wheel suspensions in which one oftentimes encounters difficulties to find a suitable point of engagement for a level regulating system effective with spring movements on both sides of the vehicle.

The present invention essentially consists in that the shock absorbers interposed between the wheels and vehicle superstructure are under the effect of a pressure medium, preferably a hydraulic pressure medium, whose pressure is controlled by the spring movements or deflections of the wheels in such a manner that the shock absorbers, in case of large load of the vehicle superstructure, are subjected to or placed under a high pressure seeking to separate the wheels and vehicle superstructure from each other, and in case of smaller loads, are subjected to or placed under a correspondingly lower pressure.

Such an installation offers the advantage that neither an additional pump nor an additional servo-piston is necessary for the height adjusting or regulating system. Furthermore, a separate equalization space may be dispensed with since the same is replaced by the line system of the height regulating installation. By reason of the direct dependency on the movement of the shock absorber piston, a rapid pumping action of the installation is attainable which brings the vehicle superstructure to the desired height relative to the wheels.

Preferably the pressure medium system comprises a high pressure tank and a low pressure tank, whereby the shock absorbers are selectively connected, depending on the spring position of the vehicle superstructure, either with the high pressure tank or with the low pressure tank. The shock absorbers are preferably constructed themselves as pumps which, in case of a relatively lower floor height of the vehicle superstructure, supply pressure medium into a high pressure tank. A control valve or a corresponding control element dependent on the spring movements of the wheels thereby controls the connection of the high pressure tank and of the low pressure tank with the pump spaces of the shock absorber pistons. By the actuation of the control element by means of an equalization member, which is moved in dependence on the stroke movement of each of the two oppositely disposed wheels, it is possible to achieve that the level regulation is rendered operable when both wheels spring deflect in the same direction whereas an actuation does not take place when the two wheels carry out mutually opposite deflections or stroke movements.

Accordingly, it is an object of the present invention to provide an installation for the automatic adjustment of the floor height of a vehicle which eliminates by simple means the shortcomings and drawbacks encountered with the prior art constructions.

Another object of the present invention resides in an installation for the automatic regulation of the height of the vehicle floor, especially in motor vehicles, which is simple in construction, rapid in operation and responsiveness, and requires only a relatively simple pressure system.

A further object of the present invention resides in an installation for the automatic adjustment of the height of the vehicle floor in motor vehicles which can be readily installed into existing vehicles and which minimizes the number of additional parts necessary.

Still another object of the present invention resides in an installation for automatically adjusting the height of the vehicle floor, especially in motor vehicles, which dispenses with additional pumps and equalization spaces for the pressure medium system thereof without jeopardizing its completely reliable and satisfactory operation.

Still a further object of the present invention resides in an automatic adjusting system for automatically adjusting the height of the floor of a vehicle which not only achieves all of the aforementioned aims and objects in a completely satisfactory manner but which additionally is so constructed and arranged as to become operative only in case of spring deflections of the wheels representative of static load changes.

These and further objects, features and advantages of the present invention will become more obvious from the following description when taken in connection with the accompanying drawing which shows, for purposes of illustration only, one embodiment in accordance with the present invention, and wherein.

Figure 1:
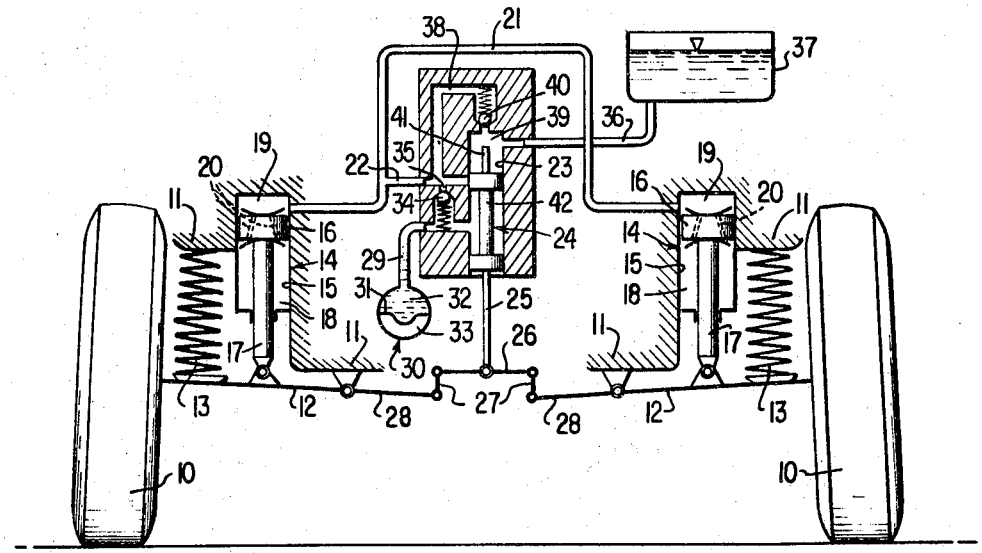
FIGURE 1 is a somewhat schematic elevational view, partly in cross section, of the control system in accordance with the present invention, with the control system in the pumping position.

Referring now to the drawing wherein like reference numerals are used throughout the various views to designate like parts, reference numerals 10 designate therein the wheels of a pair of mutually opposite, independently suspended vehicle wheels. The wheels 10 are independently suspended at the vehicle superstructure 11, which may be constituted by a frame or body parts of a self-supporting-type body construction, by means of swinging half-axles 12 or in any other known manner, the particular wheel suspension forming no part of the present invention and being therefor indicated only schematically. The wheels 10 are spring-supported, for example, by coil springs 13 against the vehicle superstructure 11 with the simultaneous use of shock absorbers generally designated by reference numerals 14 whose cylinders 15 are connected, for example, at the vehicle superstructure 11 and whose pistons 16 are connected by means of relatively strong piston rods 17 with the swinging half-axles 12 or any other wheel suspension element. The two piston spaces 18 and 19 of a shock absorber 14 may be in communication with each other by way of throttle bores 20 which may be controlled, for example, by means of automatic valves, as is known in the art.

A line 21 connects the piston spaces 19 of the two shock absorbers 14 with each other. A branch line 22 leads to a cylinder 23 within which is slidingly supported a control member, for example, a spool-type control slide valve generally designated by reference numeral 24. The control slide valve 24 is connected by way of a rod 25 with a scale beam-like equalization member 26 which, in turn, is connected with the guide members 27 that are pivotally connected to the extensions 28 of the swinging half-axles 12.

A branch line 29 branches off from the cylinder 23 which leads to a hydropneumatic high pressure tank or reservoir generally designated by reference numeral 30. The high pressure tank 30 is sub-divided by a diaphragm 31 into an upper chamber 32 connected with the line 29 and into a lower chamber 33 filled, for example, with compressed air. A connecting line 34 having a spring-loaded valve 35, which opens in the direction toward the line 29, connects with each other the lines 22 and 29. A further line 36 leads to a low pressure tank 37 which may be constructed, for example, as simple open tank from which the liquid flows to the cylinder 23 by its own gravity, or possibly also as hydropneumatic spring storage means like the high pressure tank or storage means 30. A by-pass line 38 connects the chamber 39 formed in the cylinder 23 with the line 22 and includes a spring-loaded valve 40 which opens in case of excess pressure within the chamber 39 in the direction toward the line 38 or is opened by an extension 41 at the piston slide valve 24 when the piston slide valve 24 approaches its uppermost position. The spool-type piston slide valve 24 contains additionally a control groove 42 which, depending on the position of the piston slide valve 24, either connects with each other the two lines 22 and 29 or closes off these two lines against one another.

*Operation*

Figure 2:
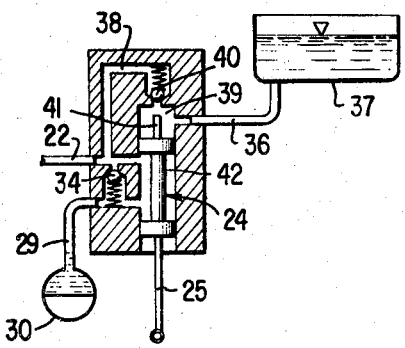
FIGURE 2 is a partial cross-sectional view, similar to FIGURE 1, and illustrating the parts of the control system in the rest position.

The operation of the installation described above is as follows:

A relatively larger load of the vehicle is assumed in FIGURE 1. The springs 13 are compressed and the pistons 20 of the shock absorbers 14 assume an upper position. The piston slide valve 24 is pulled downwardly by rod 25 and closes off the connection between the lines 22 and 29 by way of the control groove 42. If the vehicle carries out spring movements, i.e., the wheels 10 are spring-deflected toward the vehicle superstructure 11, then the pistons 16 act as pressure pistons and force the oil by way of the excess pressure valve 35 into the chamber 32 of the high pressure tank 30 whereby the pressure in the chamber 32 is determined by the compression of the air in the chamber 33. The quantity of the oil pumped into the chamber 32 is replenished from the low pressure tank 37 in that during the outward spring deflections of the wheels 10, i.e., during downward movement of the pistons 16, this quantity of oil is sucked out of the low pressure tank 37 and during the inward spring deflections, i.e., during upward movement of the pistons 16, is then forced into the chamber 32 by way of the excess pressure valve 35. The pressure in the two pistons spaces 19 thereby aids the spring pressure of the springs 13 so that the swinging half-axles 12 are pressed downwardly until they assume again a normal center position and the piston slide valve 24 assumes the position illustrated in FIGURE 2.

If the wheels carry out spring deflections about the center position thereof, then the lines 22 and 29 remain connected with each other by way of the control groove 42 within predetermined spring strokes or corresponding strokes of the piston slide valve 24 so that exclusively the liquid quantities move to and fro between the piston spaces 19 and the chamber 32 of the high pressure storage tank 30.

Figure 3:
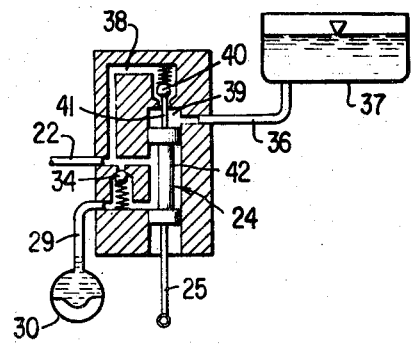
FIGURE 3 is a partial cross-sectional view, similar to FIGURE 2, illustrating the parts of the control system in the discharge position.

FIGURE 3 illustrates the position of the piston slide valve 24, serving as control member during outward spring deflections of the wheels, i.e., when the pistons 16 move downwardly. The piston slide valve 24 is then in an upper position in which it opens by means of a pin-shaped extension 41 the check valve 40. Since simultaneously the connection between the two lines 22 and 29 remains established by way of the control groove 42, and since the pistons 16 of the shock absorbers 14 are in a lower position, in which oil has been sucked into the piston spaces 19, the high pressure storage tank 30 is in a relieved condition. On the other hand, excess oil can flow off into the low pressure storage tank 37.

The pumping effect of the shock absorber pistons 16 is, therefore, the greater the larger the diameter of the piston rods 17. During upward movement of the pistons 16, the excess liquid is forced into the line system of the level regulating installation whereas conversely during downward movement of the pistons 16, the excess liquid is forced into the line system of the level regulating installation whereas conversely during downward movement of the pistons 16, liquid is sucked out of the aforementioned line system.

If only one of the two wheels undergoes spring deflections, while the other wheel remains in its normal rest position, then the height regulation by means of the control slide valve 24 or any control member otherwise provided only becomes operable in effect with a larger spring stroke. With changes in load, i.e., with simultaneous spring deflections of both wheels, the height regulation, in contrast thereto, is fully effective and operable.

While we have shown and described only one embodiment in accordance with the present invention, it is understood that the same is not limited thereto but is susceptible of numerous changes and modifications as known to a person skilled in the art. For example, in lieu of a hydraulic pressure medium, a pneumatic pressure medium may also be used. Furthermore, the present invention is not limited to independently suspended wheels but may also be used in an analogous manner with any other type of wheel suspension, for example, also with rigid axles.

Thus, it is obvious that the present invention is not limited to the details shown and described herein and we therefore do not wish to be limited thereto but intend to cover all such changes and modifications as are encompassed by the scope of the appended claims.

We claim:

1. A system for the automatic adjustment of the floor height of a spring-supported vehicle superstructure in dependence on the load thereof, comprising wheel suspension means for spring-supporting wheels at the vehicle superstructure including shock absorber means which are under the effect of a pressure medium, and control means operatively connected with said shock absorber means for subjecting said shock absorber means during higher loads of the vehicle superstructure to a relatively high pressure seeking to separate a respective wheel from the vehicle superstructure and for subjecting said shock absorber means during lower loads of the vehicle superstructure to a corresponding lower pressure, wherein each shock absorber is provided with a pressure space, and wherein said control means includes a control member actuated by the spring movements of the wheels, high pressure and low pressure tank means, and means including said control element and line means for operatively connecting the pressure space of each shock absorber means with said high pressure and low pressure tank means in such a manner that with a relatively lower floor height of the vehicle superstructure, said control element interrupts an open connection between the pressure space of each shock absorber means and said high pressure tank means, and with a relatively greater floor height of the vehicle superstructure, said control element opens up the direct connection between each pressure space and the high pressure tank means, excess and check valve means in said line means, one of said valve means opening automatically only during the suction stroke of said shock absorber means by a flow of the pressure medium in the direction from the low pressure tank means to the pressure space of the shock absorber means and another valve means opening only during the pressure stroke of the shock absorber means during a flow of the pressure medium in the direction from the pressure space to the high pressure tank means, and still further means for establishing with a relatively greater floor height of the vehicle superstructure a substantially open connection from the low pressure tank means to the pressure space of each shock absorber means in addition to the substantially open communication existing from the high pressure tank means to each space.

2. The combination according to claim 1, wherein said control element is constructed as control slide valve having an abutment which opens with a relatively large floor height of the vehicle superstructure one of said check valve means which opens automatically only in the direction of a pressure drop from the low pressure tank means to the pressure space of each shock absorber means.

3. The combination according to claim 1, further comprising an equalization member, and wherein said control member for controlling the pressure medium of the shock absorber means located on both sides of the vehicle is supported on said equalization member, said equalization member being actuated simultaneously by the spring movements of two wheels of a pair of oppositely disposed wheels and including scale beamlike means, the two ends of said scale beam-like means being operatively connected with a part of the wheel suspension means of the two wheels in such a manner that the control element remains substantially without adjustment during equal oppositely disposed stroke movements of the two wheels.

4. A system for the automatic adjustment of the floor height of a spring-supported vehicle superstructure in dependence on the load thereof, comprising wheel suspension means for spring-supporting wheels at the vehicle superstructure including shock absorber means which are under the effect of a pressure medium, and control means operatively connected with said shock absorber means for subjecting said shock absorber means during higher loads of the vehicle superstructure to a relatively high pressure seeking to separate a respective wheel from the vehicle superstructure and for subjecting said shock absorber means during lower loads of the vehicle superstructure to a corresponding lower pressure, wherein each shock absorber means includes a pressure space, said control means including high pressure and low pressure tank means and further means controlled by the spring movements of the wheels, said further means being operable, with relatively lower floor height of the vehicle superstructure, to connect the pressure space of each shock absorber means by way of a check valve with the high pressure tank means during the inward spring movements of the wheels and to connect each pressure space of each shock absorber means during outward spring movements of the wheels by way of an excess pressure valve with the low pressure tank means to thereby effectively pump pressure medium from the low pressure tank means into the high pressure tank means, whereas with relatively greater floor height of the vehicle superstructure, said further means is operable to connect the high pressure tank means and the pressure space of each shock absorber means directly with the low pressure tank means so that the pressure in the shock absorber system can be relieved by back-flow of the pressure medium into the low pressure tank means, said control means including a control member actuated by the spring movements of the wheels, and connecting means including said control element and line means for operatively connecting the pressure space of each shock absorber means with said high pressure and low pressure tank means in such a manner that with relatively lower floor height of the vehicle superstructure, said control element interrupts an open connection between the pressure space of each shock absorber means and said high pressure tank means, and with a relatively greater floor height of the vehicle superstructure said control element opens up the direct connection between each pressure space and the high pressure tank means, excess and check valve means in said line means, one of said valve means opening automatically only during the suction stroke of said shock absorber means by a flow of the pressure medium in the direction from the low pressure tank means to the pressure space of the shock absorber means and another valve means opening only during the pressure stroke of the shock absorber means during a flow of the pressure medium in the direction from the pressure space to the high pressure tank means, and still further means for establishing with a relatively greater floor height of the vehicle superstructure a substantially open connection from the low pressure tank means to the pressure space of each shock absorber means in addition to the substantially open communication existing from the high pressure tank means to each pressure space.

5. The combination according to claim 4, wherein said control element is constructed as control slide valve having an abutment which opens with a relatively large floor height of the vehicle superstructure one of said check valve means which opens automatically only in the direction of a pressure drop from the low pressure tank means to the pressure space of each shock absorber means.

6. The combination according to claim 5, further comprising an equalization member, and wherein said control member for controlling the pressure medium of the shock absorber means located on both sides of the vehicle is supported on said equalization member, said equalization member being actuated simultaneously by the spring movements of two wheels of a pair of oppositely disposed wheels and including scale beam-like means, the two ends of said scale beam-like means being operatively connected with a part of the wheel suspension means of the two wheels in such a manner that the control element remains substantially without adjustment during equal oppositely disposed stroke movements of the two wheels.

7. The combination according to claim 2, further comprising an equalization member, and wherein said control member for controlling the pressure medium of the shock absorber means located on both sides of the vehicle is supported on said equalization member, said equalization member being actuated simultaneously by the spring movements of two wheels of a pair of oppositely disposed wheels and including scale beam-like means, the two ends of said scale beam-like means being operatively connected with a part of the wheel suspension means of the two wheels in such a manner that the control element remains substantially without adjustment during equal oppositely disposed stroke movements of the two wheels.

8. The combination according to claim 7, further comprising pneumatic spring means, the hydraulic medium being stored in said high pressure tank means under compression of the pneumatic spring means.

9. The combination according to claim 8, wherein the low pressure tank means includes a tank under atmospheric pressure.

10. A system for the automatic adjustment of the floor height of a spring-supported vehicle superstructure, comprising:

wheel suspension means for spring-supporting wheels at the vehicle superstructure, including spring means, shock absorber means under the effect of a pressure medium, and control means operatively connected with said shock absorber means, said control means including a pressure medium system having high pressure and low pressure tank means and selectively operable means selectively connecting said shock absorber means with either said high pressure tank means or with said low pressure tank means depending upon the condition of the spring means between the wheels and the vehicle superstructure, said shock absorber means being constructed as pump means and having a pressure space, said control means further including check valve means connecting the pressure space of each shock absorber means with the high pressure tank means upon compression of the spring means and excess pressure valve means connecting the pressure space of each shock absorber means with the low pressure tank means upon tension of the spring means, thus pumping pressure medium from the low pressure tank means to the high pressure tank means when the vehicle superstructure is in a relatively low floor height position.

said control means being further operative, when the vehicle superstructure is in a relatively high floor height position, to connect the high pressure tank means and the pressure space of each shock absorber means directly with the low pressure tank means so that the pressure in the shock absorber system can be relieved by back-flow of the pressure medium into low pressure tank means.

11. The combination according to claim 10, wherein said control means includes a control member actuated by the spring movements of the wheels, and connecting means including said control element and line means for operatively connecting the pressure space of each shock absorber means with said high pressure and low pressure tank means in such a manner that with relatively lower floor height of the vehicle superstructure, said control element interrupts an open connection between the pressure space of each shock absorber means and said high pressure tank means, and with a relatively greater floor height of the vehicle superstructure said control element opens up the direct connection between each pressure space and the high pressure tank means, excess and check valve means in said line means, one of said valve means opening automatically only during the suction stroke of said shock absorber means by a flow of the pressure medium in the direction from the low pressure tank means to the pressure space of the shock absorber means and another valve means opening only during the pressure stroke of the shock absorber means during a flow of the pressure medium in the direction from the pressure space to the high pressure tank means, and still further means for establishing with a relatively greater floor height of the vehicle superstructure a substantially open connection from the low pressure tank means to the pressure space of each shock absorber means in addition to the substantially open communication existing from the high pressure tank means to each pressure space.

12. The combination according to claim 11, wherein said control element is constructed as control slide valve having an abutment which opens with a relatively large floor height of the vehicle superstructure one of said check valve means which opens automatically only in the direction of a pressure drop from the low pressure tank means to the pressure space of each shock absorber means.

13. The combination according to claim 10, wherein said pressure medium is a hydraulic pressure medium.

14. The combination according to claim 13, wherein the low pressure tank means includes a tank under atmospheric pressure.

15. The combination according to claim 13, further comprising high pressure tank means including pneumatic spring means, the hydraulic medium being stored in said high pressure tank means under compression of the pneumatic spring means.

References Cited

UNITED STATES PATENTS

| | | | |
|---|---|---|---|
| 3,227,466 | 1/1966 | Garcea | 280—6 |
| 3,181,877 | 5/1965 | McHenry | 280—6 |
| 3,038,739 | 6/1962 | Vogel. | |
| 2,993,705 | 7/1961 | D'Avigdor. | |

PHILIP GOODMAN, *Primary Examiner.*